May 15, 1945. H. S. HOFFAR 2,375,991
VARIABLE PRESSURE DRILL FEED
Filed June 2, 1941 2 Sheets-Sheet 1
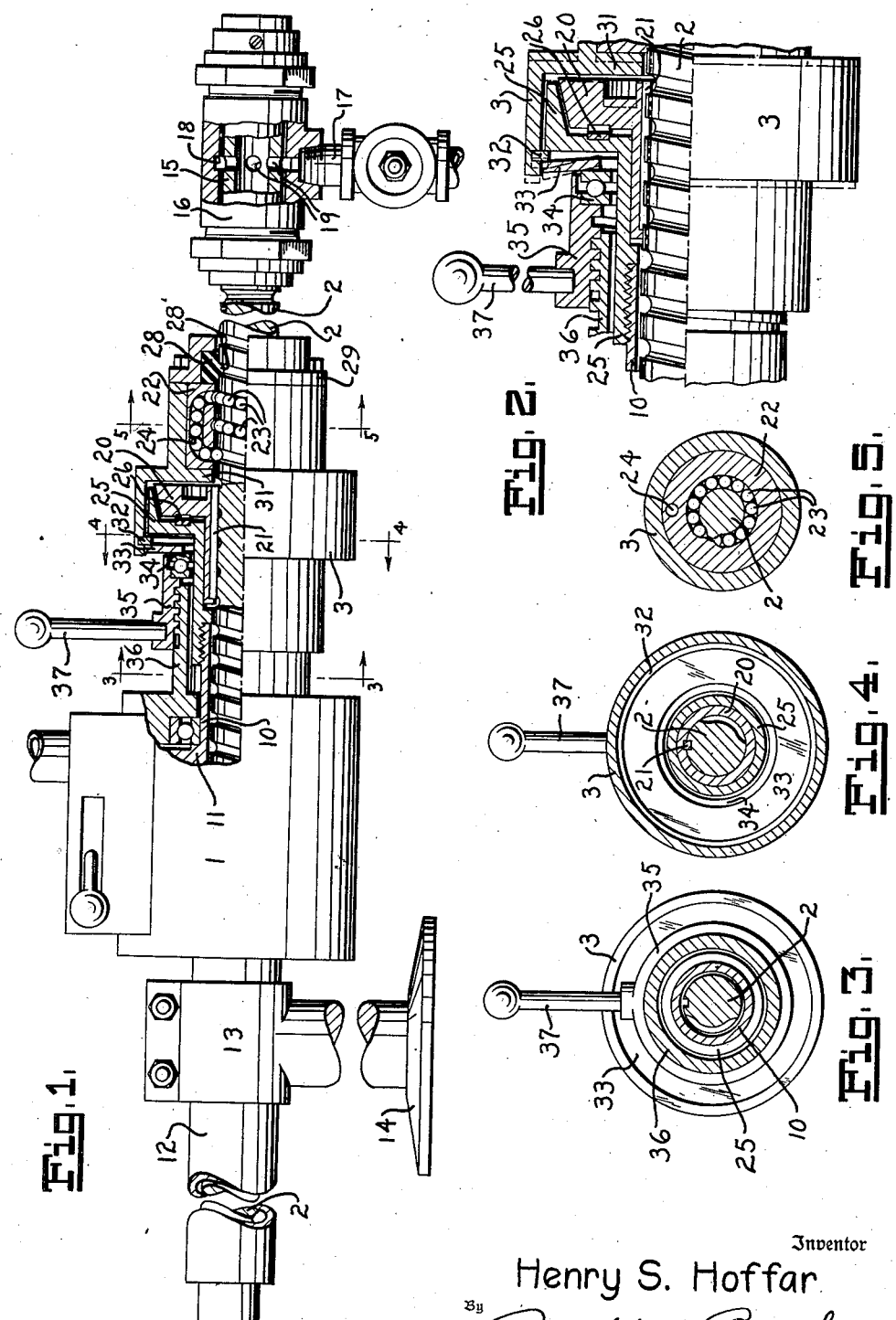
Inventor
Henry S. Hoffar
By Reynolds & Beach
Attorney May 15, 1945.  H. S. HOFFAR  2,375,991
VARIABLE PRESSURE DRILL FEED
Filed June 2, 1941  2 Sheets-Sheet 2
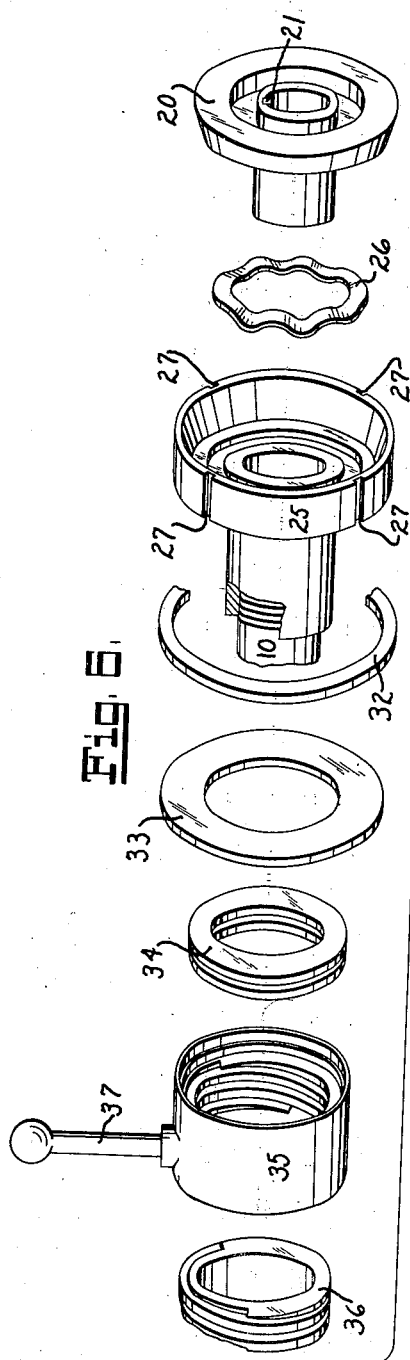
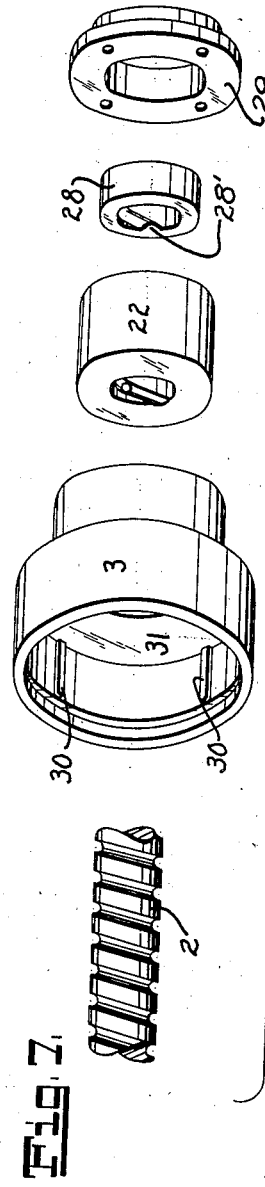
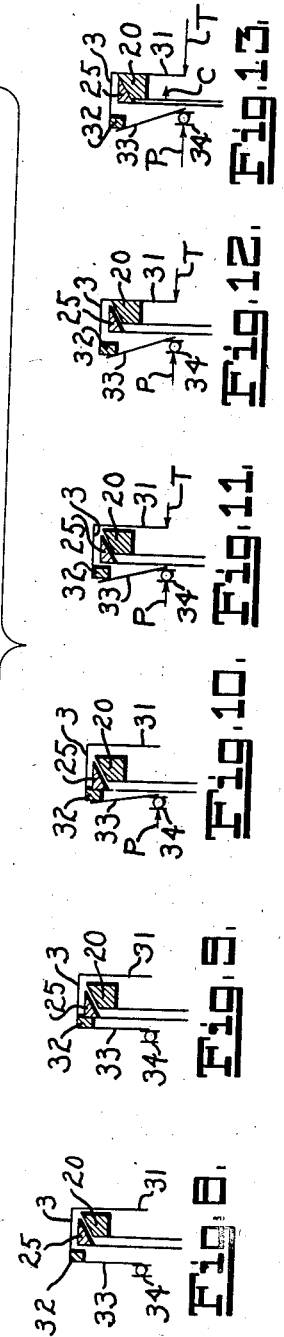
Inventor
Henry S. Hoffar
By Reynolds & Beach
Attorney

UNITED STATES PATENT OFFICE 2,375,991

VARIABLE PRESSURE DRILL FEED

Henry S. Hoffar, Vancouver, British Columbia, Canada, assignor to International Multifeed Drills, Ltd., Vancouver, British Columbia, Canada, a corporation of British Columbia, Canada Application June 2, 1941, Serial No. 396,284

21 Claims. (Cl. 255—45)

The drill feed to which my present invention relates is particularly suitable for rock drills of the rotative type, but mechanisms employing the principles of my feed may be used with drills for other purposes, particularly where materials of different or non-uniform hardness are to be drilled. In either case my feed enables the drill to move forward as rapidly as the resistance of the material warrants, but the rate of forward feed will be reduced automatically as greater thrust resistance is encountered in drilling harder material.

My automatic feed mechanism is particularly well adapted for employment with a rotative feed screw carrying a drill bit which moves both longitudinally and rotatively with the feed screw, while the driving motor for the screw is held stationary and supported by a suitable mount. This mechanism may include such a screw which extends axially through a bore in the motor rotor and through a clutch associated with it. The rotor turns the driving clutch element, and the cooperative driven clutch element is splined or connected by a sliding key to the feed screw to rotate conjointly. Axial movement of the screw is accomplished by a feed nut engaged with it, which is continuously rotated in synchronism with the motor rotor and the driving clutch element. The screw will thus move lengthwise when its rotation is slower than that of the nut.

The ratio of forward feed to rotation of the feed screw is variable and will be determined by the degree of engagement between the driving and driven clutch elements. When these are positively engaged to turn in unison the screw will be rotated by the driven clutch member keyed to it at the same speed as the motor rotor and the feed nut, so that because of the total lack of relative movement between the screw and nut no longitudinal feed of the screw will occur, and its movement will be purely rotative. At the opposite extreme, if the driven clutch member is completely disengaged from the driving clutch member, no appreciable rotative force will be exerted on the feed screw, but because the feed nut continues to rotate at the same speed as the motor rotor maximum forward travel of the screw will occur without any rotation. It is assumed in the latter instance that sufficient resistance to rotation of the screw is present to overcome any slight drag which there may be between the driving and driven clutch parts.

Between these purely rotative and purely translational movements of the feed screw lies every combination of forward and rotative movement.

The clutch may be of any suitable type, but should be capable of prolonged slipping operation without being subjected to excessive wear. The degree of engagement of the driving and driven elements controlling the amount of slipping action is governed by endwise pressure on the feed screw, created by resistance to penetration of the material being drilled, and transmitted through the nut to press the clutch elements together. As the pressure between the clutch elements becomes greater the engagement becomes more positive and the slippage becomes progressively less, so that the speed of rotation of the feed screw will increase, tending to approach more nearly the speed of the motor rotor, while its forward movement will decrease correspondingly. Conversely, as the thrust resistance decreases, the clutch mechanism will tend to move its driving and driven clutch elements apart, thus to increase their slippage, and the rate of rotation will be correspondingly lessened, accompanied by a greater rate of forward feed.

As stated, interengagement of the driven and driving clutch elements to a greater or less degree is effected by backward thrust on the feed screw acting upon the feed nut to force it rearwardly a small distance to enable the clutch elements to be engaged. To prevent such clutch-engaging movement of the nut by negligible rearward thrust it is pressed yieldingly forward by spring means reacting from the stationary motor casing. Such resilient nut mounting enables the amount of rearward thrust required to effect a given engagement of the clutch elements to be varied. Thus if a strong resilient forward pressure is exerted upon the feed nut an equally strong rearward thrust, created by resistance to penetration of the drill, must be set up before sufficient rearward movement of the nut to engage the clutch parts will occur. Adjusting mechanism for this resilient pressure arrangement is provided to enable the operator to increase or to decrease at will the amount of rearward thrust required for a given engagement of the clutch parts.

The advantages of my drill feed mechanism will be evident from the foregoing description. Forward feed of the drill will be accomplished at a maximum rate, and with little or no rotation of the drill, as long as resistance to its peneration remains below a predetermined or preset value. If a hard stratum is encountered the clutch elements will be forced into firmer engagement, and the speed of drill rotation will thereupon automatically increase with a corresponding decrease in forward speed until, if the resistance to penetration of the drill becomes sufficiently great, the movement of the feed screw will be predominately, or even almost entirely, rotative, and the forward feed will be correspondingly slow. Thus when greater cutting ability of the drill is required for it to progress, its rotative speed, which directly influences its cutting ability, is increased.

As directed by the type of material being drilled, and the size of the drill being used, the degree of rearward thrust required to effect positive engagement of the clutch elements may be varied at will over a wide range by manual adjustment. Moreover, such adjustment may be accomplished prior to commencement of the drilling operation, or may be effected or altered at any time during such operation.

Not only does my invention provide a drill having these desirable automatic feed characteristics and manual control, but the mechanism which I employ for this purpose is unusually compact, both lengthwise and radially. Such compactness is achieved primarily by arranging the parts concentrically of the motor and disposing the feed screw axially through the motor.

A practical embodiment of my automatic feed mechanism is illustrated in the drawings, but modifications in various details and elements may be desirable for special applications of the principles involved in its construction.

Figure 1 is a side elevation view of the drill mechanism, showing parts thereof in section.

Figure 2 is a similar side elevation view of a portion of the feed mechanism, partly in section, showing parts in a different operative relationship.

Figures 3, 4, and 5 are transverse sections taken along lines 3—3, 4—4, and 5—5, respectively, of Figure 1.

Figure 6 is an exploded view showing in perspective the parts comprising the left portion of the feed mechanism illustrated in Figure 1, while Figure 7 is a similar exploded view showing in perspective the parts of which the right portion of the mechanism of Figure 1 is composed.

Figures 8, 9, 10, 11, 12, and 13 are diagrammatic sectional views through parts of the feed mechanism, illustrating various relative positions assumed by these elements under different conditions of clutch control mechanism adjustment and thrust resistance to penetration of the drill.

The motor 1 may be of any suitable type to impart rotation to the sleeve 10, which is integral with the motor rotor 11, but I prefer that it develop a substantially constant torque in all rotative positions of the rotor. The motor casing remains stationary, being supported by the feed screw housing tube 12 received in a clamp 13 which is provided with the usual conical swivel or trunnion plate 14 adapted to be secured in a post support. The length of the tube 12 will depend upon the length of feed screw 2 employed, and should be long enough so that its closed left end, as seen in Figure 1, will not prevent full retraction of the screw. This tube protects the screw from damage and from accumulating dirt which might be carried by it into the motor and feed mechanism. At the other end the screw carries a tubular shaft 15 provided with a suitable drill chuck or equivalent drill-holding device, for supporting a drill projecting beyond the right end of this shaft as seen in Figure 1. A non-rotative water supply sleeve 16, for supplying cooling water to the drill point through its usual bore, is journaled upon the shaft. Water is furnished by a pipe 17, controlled by suitable valve means, to an annular groove 18 in the inner surface of sleeve 16, from which it flows in all rotative positions of the screw through apertures 19 into the bore of shaft 15, for delivery to the hollow drill. The sleeve 16, which does not rotate with the shaft 15, is journaled in any suitable manner upon it, and is packed at each end by suitable glands to prevent water leaking out between the encircling sleeve and the drill supporting tube.

The feed control mechanism includes two principal driving elements, one for rotating the feed screw and the other for moving it axially. A driven clutch member 20, which is splined to the screw 2, or keyed to it by a key 21, for continuous rotation therewith, is operable, under conditions to be described hereafter, to exert a rotative torque on the screw, which in turn rotates the drill. Axial advance of the screw is effected by a feed nut 22 in threaded engagement therewith. This feed nut and screw are preferably of the type shown in my copending application Serial No. 384,138, filed March 19, 1941, for an Anti-friction Screw Device now Patent 2,298,011, dated Oct. 6, 1942. The nut 22, instead of having lands directly interengaged with the grooves of the screw, likewise has a groove whose size and pitch corresponds to that of the screw groove. The interengagement between the screw and nut is effected by balls 23 received in the grooves of each, and preferably alternate balls seat in both grooves to transmit load between them, and the balls interposed therebetween are slightly smaller in diameter than such seating, load-carrying balls, and rotate in the opposite direction to provide rolling contact between all adjacent balls, as described in my aforesaid application.

The balls 23 circulate between the screw and nut, progressing axially relative to the nut at just half the axial speed of the screw relative to the nut. Instead of moving out from between the screw and nut, however, the balls engage a deflecting pin carried by the end of the nut from which the screw emerges adjacent to the end of a by-pass passage 24 extending generally axially through the nut. This pin deflects the balls into the passage for movement along it opposite to the direction of travel of the screw relative to the nut, to be discharged from the other end of the passage into interengagement again between the screw and the end of the nut into which the screw moves. It will be evident that no matter how great the axial travel of the screw through the nut may be, this recirculation of the balls 23 will continue so that the entire helical path formed jointly by the nut and screw grooves will at all times be substantially filled with the balls 23, as will the by-pass passage 24.

With the driven clutch element 20 cooperates a driving clutch member 25, which is integral or rigid with the tube 10 carried by the rotor, being threaded thereon or otherwise secured thereto. I have portrayed a clutch of the cone type, the driving element 25 being shown as the external member and the driven element 20 as the internal member. Such structure is merely illustrative of a suitable clutch which is capable of positive engagement, yet which can operate under slipping conditions, under which the driving element rotates faster than the driven element, for prolonged periods without being subject to failure or to inordinate wear or deterioration. The clutch should also be of the self-releasing type, in the present instance the internal and external clutch members being resiliently urged out of engagement by a weak annular spring 26 interposed between them and received in registering grooves in their adjacent faces. Both clutch elements are received within one end of a housing 3, with which the driving clutch member is connected for conjoint rotation but for relative lengthwise movement. Thus keys or splines 30 on the housing 3, as shown in Figure 7, are arranged to engage in longitudinal slots 27 formed in the periphery of clutch element 25. The housing 3 will thus be driven by the member 25 in synchronism with the rotor 11.

In the opposite end of the housing 3 is secured nut 22 in such a manner that the housing and nut revolve as a unit and are incapable of relative lengthwise movement. Thus the nut may be keyed or secured by set screws to the housing, or it may be held in place by a press fit. If a separate nut structure is not desired the right end of the housing in Figure 1 may merely be threaded in the conventional manner to engage the screw groove, itself forming the feed nut. As shown in the drawings, however, a cap 29 bolted to the end of the housing 3 presses axially against nut 22, in turn forced against a central internal flange of the housing, forming part of the dividing wall 31, with sufficient friction or clamping action to hold the nut rigid with the housing. Preferably the cap 30 is recessed centrally to receive a sealing ring 28 which has a helically directed tongue 28' running in the groove of feed screw 2. This ring may be of rubber, so that upon being compressed endwise between the cap 29 and nut 22 its tongue 28' is forced tightly into engagement with the walls of the screw groove, and continually seals it to prevent dirt and foreign particles from being carried into the feed mechanism. A second similar wiping ring should also be provided at the opposite end of the motor if the end of the feed screw opposite that carrying the drill is not completely housed within the tube 12.

The dividing wall 31 of housing 3 separates the nut 22 from the clutch elements and serves as the right end of the clutch chamber as shown in Figure 1. The driving clutch member 25, being the outer of the two, is held in such chamber by a retainer ring 32 received in an internal groove near the housing's left end. The spacing between the partition wall 31 and ring 32 is such that the parts may assume the neutral position shown in Figures 1 and 8, in which the clutch parts are held out of engagement by the annular spring 26, and yet the driven element 20 is spaced from the wall 31, and the driving element 25 is spaced from the retainer ring 32.

Against the outer face of ring 32 seats a spring plate 33, whose outer edge fits closely within the end of the housing 3, which serves to restrain radial displacement of the plate. The plate's inner periphery lies adjacent to the reduced portion of the driven clutch element 20, and is engaged by one face of an antifriction thrust bearing 34 also encircling the driven clutch member sleeve. A collar 35, threaded upon a stationary tubular extension 36 of the casing of motor 1 is in contact with the opposite side of this bearing, which eliminates friction between the normally stationary collar 35 and the spring plate 33 normally revolving with housing 3 in synchronism with the rotor 11. A handle 37 projecting radially from the collar is provided for effecting pressure adjusting rotation thereof relative to tube 36, to move the collar axially for forcing the bearing 34 with greater or less pressure against the inner periphery of spring plate 33.

The compactness of my feed mechanism structure will be evident from the foregoing description. The feed screw 2, it will be noted, extends centrally through the mechanism, and all the other parts are arranged around the screw. The feed operating parts, including the motor rotor 11, the clutch elements 20 and 25, the feed nut 22, the housing 3 which encloses these parts, and the pressure control mechanism, including the spring plate 33, thrust bearing 34, and the threadedly connected collar 35 and motor extension 36, are all annular in form, are disposed relatively concentrically, and are concentric with the feed screw. The same is true of the accessories, including the screw protecting tube 12 and the cooling water supply sleeve 16. The only radially projecting parts are the supporting plate 14, the feed control handle 37, water supply pipe 17, and the power supply for the motor 1, which may be a conduit for pressure fluid, as shown. No auxiliary ways or guides are required to carry the motor or the drill-supporting mechanism as ordinarily provided. My mechanism, therefore, not only affords a greatly superior type of operation, but is unusually compact and symmetrical in arrangement, improving the balance of the machine.

Figures 1 and 8 illustrate the parts in neutral, unstressed position, with sleeve 35 retracted and the clutch elements 20 and 25 held apart by the clutch spring 26. Both clutch elements are spaced from the ends of the housing chamber in which they are received, defined by the ring 32 and by the partition wall 31. With the parts in this position sleeve 35 remains stationary, but the driving clutch element 25 is rotated by the rotor, serving to rotate also, in synchronism, the interconnected housing 3, spring plate 33 and feed nut 22. Because the driven clutch element 20 is in contact neither with the driving clutch element 25 nor with the housing wall 31, it is not subjected to rotative torque, except possibly for a negligible drag transmitted through the clutch spring 26, and consequently the screw 2 does not turn. The relative rotation between the non-rotating screw and the rotating nut 22 therefore feeds the screw forward to a position in which the drill is ready to engage the work.

The operator now determines the pressure conditions under which he wishes the drill to operate. By turning handle 37 in the proper direction sleeve 35 is rotated to move axially away from the motor 1, and to exert pressure on bearing 34, which causes the latter to press against spring plate 33, forcing it, and through it housing 3 and ring 32, to the right in Figure 1 until such ring is brought into engagement with the driving clutch element 25, as shown diagrammatically in Figure 9. No further axial movement of the housing in this direction is possible, for element 25 is tied axially to sleeve 36 through its connection to sleeve 10 and the mounting thrust bearings of rotor 11. It will be remembered that both the ring 32 and the driving clutch element 25 rotate in synchronism with the rotor so that no relative rotation occurs between them whether or not they are in engagement.

After such rotation of sleeve 35, the housing 3 will have been moved to the right, but no appreciable pressure will be exerted on the spring plate. Further turning of the handle in the same direction will, however, exert pressure upon and actually deflect the spring plate 33 into a position such as shown in solid lines in Figure 2 and diagrammatically in Figure 10. The reaction of the spring plate will, of course, be transmitted to the ring 32, thence to the driving clutch element 25, and back through its connection with the rotor 11 to the motor bearings, casing 1, and sleeve 36, placing these parts under stress but effecting no relative movement among them. Spring plate 33 is quite stiff, so that a relatively small deflection of its inner periphery will create a considerable forward force on the housing 3, which is indicated by the force vector arrow P in Figure 10.

The machine is now ready for the drill to engage the work. Because of the disengagement of the clutch parts the screw will continue to move forward without rotation until a substantial resistance to penetration of the drill has occurred. Such resistance will create a backward thrust, as indicated by the force vector T in Figure 11, which is transmitted from the screw 2 to the housing 3 through the interengaged nut 22. As this thrust builds up the housing will be forced rearwardly, as shown in Figure 11, to deflect further the spring plate 33 seating against ring 32, which will further increase the resilient pressure vector P, as indicated. The clutch parts 20 and 25 are still not engaged, but have assumed the initial position with respect to the housing 3 shown in Figure 8, the resilient pressure and penetration resistance thrust forces being equal.

As the rearward resistance thrust continues to increase the housing 3, and consequently the outer periphery of spring plate 33, will be moved farther to the rear, as shown in Figure 12, while the bearing 34 continues to resist rearward movement of its inner periphery so that the spring plate is flexed still more, until the partition wall 31 engages the driven clutch element 20. The friction between the rotative wall and such element will be insufficient to revolve the latter and the screw 2, however, because the driven clutch element 20 is free to slide axially rearward along the screw away from the wall, such movement being resisted only by the light spring 26. Eventually the thrust occasioned by the resistance to penetration of the drill becomes sufficiently great, however, to overcome not only the resilient pressure P of the deflected spring plate, augmented by such rearward movement of the housing 3, but also the light pressure of the clutch spring 26, indicated as the vector C in Figure 13. Actually the increase in deflection of spring plate 33 by such rearward movement of housing 3 is not very great, but has been exaggerated in the broken line illustration of Figure 2 and in Figure 13 to render the action more apparent. The driven clutch element will now be clamped more or less tightly between the driving clutch element 25 and the partition wall 31, rotating at the same speed.

Depending upon the tightness with which it is clamped between member 25 and wall 31 clutch element 20 will be driven at a speed more or less nearly equal to that of rotor 11, to rotate screw 2 at the same rate. If the resistance becomes sufficiently great the element 20 will be clamped tightly between the driving clutch member and the wall so that the screw will be rotated thereby at a speed equal to that of the rotor, and because of the cessation of relative movement between nut 22 and feed screw 2 longitudinal screw movement will cease simultaneously. It may be that the increased resistance is a temporary condition, so that after a few revolutions the drill will cut through the hard stratum to relieve the backward end thrust caused by the resistance to drill penetration, and the clutch spring 26 will decrease the engaging pressure between the clutch elements slightly, so that the element 20 and the feed screw will not be revolved as fast as the rotor, thus again effecting relative rotation between the screw and feed nut to resume axial forward movement of the screw.

If, under these conditions, pure rotation of the drill continues without forward movement for an appreciable length of time, the operator may turn handle 37 during rotation of the drill to deflect spring plate 33 farther by forward movement of its inner periphery, which increases the thrust required to clamp driven clutch element 20 sufficiently tightly between the wall 31 and element 25 to effect synchronous rotation therewith. It will be noted that any manual pressure adjustment can thus be made without altering the clutch mechanism itself or its inherent resilient releasing characteristics. All the pressure adjusting mechanism is entirely separate from the clutch. If the resistance to forward feed is less than this newly established forward resilient pressure value the clutch will immediately begin to slip so that the rotative speed of the drill will drop slightly and forward feed will be resumed. It will be understood that under normal conditions drill operation will occur with the parts in the relationship shown in Figure 13 and in broken lines in Figure 2, the clutch element 20 being clamped to a greater or less extent between the driving clutch element 25 and the wall 31, the degree of clamping varying automatically as the resistance to penetration of the drill varies, and in response to and commensurate with such penetration resistance. The screw will ordinarily be both rotating and moving forward slowly, the relative speeds of rotation and translation depending on the pressure exerted upon spring plate 3 by bearing 34 as determined by the axial position of sleeve 35, as well as on the resistance to penetration of the drill. Whenever the resistance increases, the rotative speed will automatically be increased while the forward speed will be correspondingly decreased.

As stated, the type of motor employed is not an essential part of my present invention, but it preferably is of the reversible, variable speed type, as well as exerting substantially uniform torque in all rotative positions. Thus not only is the drilling speed subject to control automatically in accordance with the resistance encountered to penetration of the drill, as previously described, but the operation of the drill as a whole may be expedited or retarded according to the speed for which the motor control is set.

My feed mechanism is further very useful to retract the drill rapidly, for upon reversal of the direction of motor rotation the feed nut 22 will be driven at rotor speed in the direction opposite to that in which it turns for feeding the drill forward. During retraction, of course, there will be no rearward axial pressure upon the screw which might cause it to rotate, so that it is merely necessary to apply enough rotative friction to the screw to overcome the drag of the clutch spring 26, whereupon the screw will be moved backward without rotation at high speed. Before this operation it is not necessary to turn handle 37 for relaxing spring plate 33, so that the pressure does not have to be reset for the next drilling operation unless desired. A suitable friction or locking member may be incorporated in the machine itself which will hold the screw against rotation by the drag of clutch spring 26 during such retracting movement, or during forward feed of the drill into engagement with the work.

What I claim as my invention is:

1. Feed mechanism for a drill or the like, comprising power means, drill supporting means, drill rotating means driven by said power means and operatively connected to rotate said drill supporting means, drill feed means driven by said power means and operatively connected to move said drill supporting means longitudinally, control means operable automatically upon said drill feed means in response to an increase in resistance to movement of the drill to increase the rotative speed of said drill supporting means relative to that of said power means, and manual regulating means non-rotatable by said power means and operable at will while said feed means are driven by said power means to regulate said automatically operable control means, thus to vary the amount of such increase in rotative speed of the drill supporting means relative to said power means for a given increase in resistance to drill movement.

2. Feed mechanism for a drill or the like, comprising power means, drill supporting means, drill rotating means driven by said power means and operatively connected to rotate said drill supporting means, drill feed means driven by said power means and operatively connected to move said drill supporting means longitudinally, control means operable automatically both upon said drill feed means and said drill rotating means in response to an increase in resistance to axial penetration of the drill, simultaneously to retard longitudinal movement and to increase the rotative speed of said drill supporting means relative to that of said power means, and manual regulating means non-rotatable by said power means and operable at will while said feed means are driven by said power means to regulate said automatically operable control means, thus to vary the amount of retardation of such longitudinal movement and of such increase in rotative speed of the drill supporting means relative to said power means for a given increase in resistance to the drill's axial penetration.

3. Feed mechanism for a drill or the like comprising power means, a support for said power means, drill supporting means, a feed screw adapted to move said drill supporting means longitudinally, a feed nut threaded upon said feed screw, screw rotating means, including clutch means, interposed between said power means and said feed screw adapted to effect relative rotation between said screw and nut, control means operable automatically upon said clutch means in response to an increase in resistance to movement of the drill to reduce the relative rotation between said feed nut and screw, and regulating means directly interengaged between said control means and said power means support and operable to adjust said control means to vary the amount of reduction in relative feed nut and screw rotation for a given increase in resistance to drill movement.

4. Feed mechanism for a drill or the like comprising power means, drill supporting means, a feed screw adapted to move said drill supporting means longitudinally, an anti-friction feed nut threaded upon said feed screw and positively rotated at all times in synchronism with said power means, said feed nut including a sleeve having grooves therein complemental to the feed screw grooves, and balls interengaged between said sleeve and said feed screw and received in the grooves thereof, screw rotating means, including clutch means, driven by said power means and connected to rotate said feed screw, and control means for said clutch means operable to effect rotation of said screw at a speed less than that of said feed nut for producing relative axial movement thereof.

5. Feed mechanism for a drill or the like comprising power means, drill supporting means, a feed screw adapted to move said drill supporting means longitudinally, an anti-friction feed nut threaded upon said feed screw and positively rotated at all times in synchronism with said power means, said feed nut including a sleeve having grooves therein complemental to the feed screw grooves, and balls interengaged between said sleeve and said feed screw and received in the grooves thereof, screw rotating means, including clutch means, driven by said power means and connected to rotate said feed screw, and control means operable automatically upon said clutch means by a rearward thrust on said feed screw acting through said feed nut to effect rotation of said screw by said screw rotating means at variable speeds, and thereby to reduce the relative rotation between said feed nut and screw commensurate with such thrust, for decreasing correspondingly the rate of longitudinal screw movement.

6. Feed mechanism for a drill or the like, comprising power means, drill supporting means, rotative drill feed means driven by said power means and operatively connected to move said drill supporting means longitudinally, control means operable automatically upon said drill feed means in response to an increase in resistance to movement of the drill to retard the longitudinal movement of said drill supporting means, manual regulating means incapable of being rotated by said feed means and operable at will while said feed means are driven by said power means to vary the amount of retardation of said longitudinal movement of the drill supporting means for a given increase in resistance to drill movement, and means interengaged between and rotatively separating said rotative drill feed means and said regulating means to prevent transmission of appreciable torque from said drill feed means to said regulating means.

7. Drive mechanism for a drill or the like, comprising power means, drill supporting means, a driving clutch member rotatable by said power means, a driven clutch member operatively connected to said drill supporting means, clutch engaging means operable to move said two clutch members into driving engagement to drive said drill supporting means, spring means resisting such operation of said clutch engaging means, and regulating means manually operable during rotation of said driving clutch member by said power means to vary the force exerted by said spring means, thereby to alter the resistance to such operation of said clutch engaging means.

8. Drive mechanism for a drill or the like, comprising power means, drill supporting means, a circular driving clutch member rotatable by said power means, a circular driven clutch member operatively connected to said drill supporting means, and an annular spring plate disposed concentrically with but not interposed between said clutch members, operable to resist engaging movement thereof.

9. Drive mechanism for a drill or the like, comprising power means, drill supporting means, a driving clutch member rotatable by said power means, a driven clutch member operatively connected to said drill supporting means, and manual regulating means including a non-rotative threaded member and a rotatable threaded member screwed together and relatively rotatable manually for regulating engagement of said clutch members.

10. Feed mechanism comprising a housing, a screw extending into said housing and movable longitudinally thereof, a nut cooperating with said screw and enclosed within said housing, and a packing collar encircling said screw at one end of said housing, and having a rib complemental to the helical groove of said screw and extending inwardly into such groove, to wipe from the groove foreign material lodged therein, thus to prevent entrance of such material into said housing as the screw moves longitudinally into it.

11. Feed mechanism comprising a housing, a screw extending into said housing and movable longitudinally thereof, a nut, cooperating with said screw and enclosed within said housing, a plurality of bearing balls interengaged between said screw and said nut and received in the grooves thereof, and a packing collar encircling said screw at one end of said housing, and having a rib complemental to the helical groove of said screw and extending inwardly into such groove, to wipe from the groove foreign material lodged therein, thus to prevent entrance of such material into said housing as the screw moves longitudinally into it.

12. Feed mechanism for a drill or the like, comprising power means, drill supporting means, drill feed means driven by said power means and operatively connected to move said drill supporting means longitudinally, relatively rotatable friction members variably engageable to alter the speed of longitudinal feed of said drill supporting means effected by said drill feed means, resilient means controlling the force of engagement between said friction members, manual regulating means operable to vary the stress exerted by said resilient means, and means interengaged between and rotatively separating said manual regulating means from said power means to present transmission of appreciable torque therefrom to said regulating means.

13. Feed mechanism for a drill or the like, comprising power means, drill supporting means, drill feed means driven by said power means and operatively connected to move said drill supporting means longitudinally, relatively rotatable friction members variably engageable to alter the speed of longitudinal feed of said drill supporting means effected by said drill feed means, resilient means controlling the force of engagement between said friction members, manual regulating means including a non-rotative threaded member and a rotatable threaded member screwed together and relatively rotatable manually for varying the stress exerted by said resilient means, and means interengaged between and rotatively separating said manual regulating means from said friction members to prevent transmission of appreciable torque therefrom to said regulating means.

14. Feed mechanism for a drill or the like, comprising power means, drill supporting means, drill feed means including relatively rotatable feed screw and nut elements operatively connected to move said drill supporting means longitudinally, at least one of said feed elements being driven by said power means, relatively rotatable friction members variably engageable to alter the relative speed of rotation of said feed elements, thus to change the rate of longitudinal feed of said drill supporting means, resilient means controlling the force of engagement between said friction members, manual regulating means including a non-rotative threaded member and a rotatable threaded member screwed together and relatively rotatable manually for varying the stress exerted by said resilient means, and means interengaged between and rotatively separating said manual regulating means from said friction members to prevent transmission of appreciable torque therefrom to said regulating means.

15. Feed mechanism for a drill or the like comprising power means, drill supporting means, clutch means operatively connected both to said power means and to said drill supporting means to drive the same, and engageable by rearward thrust on said drill supporting means, and an annular spring plate acting upon said clutch means in opposition to rearward thrust on said drill supporting means to resist driving engagement of said clutch means.

16. Feed mechanism for a drill or the like comprising a power drive, a drill support, drill rotating means driven by said power drive and operatively connected to rotate said drill support, drill feed means driven by said power drive and operatively connected to move said drill support for feeding the drill lengthwise, a friction clutch operatively connected both to said power drive and to one of said means to drive the same, and engageable by rearward thrust on said drill support, and a substantially planar annular spring plate acting upon said clutch means in opposition to rearward thrust on said drill support to resist driving engagement of said clutch.

17. The mechanism of claim 16, and means nonrotatable by said power means and engaging the annular spring plate for varying at will the resistance to driving engagement of the clutch exerted thereby.

18. Feed mechanism for a drill or the like comprising a feed screw, a feed nut engaged with said screw, power means operatively connected to rotate said feed nut conjointly therewith, rotating means for said screw including clutch means engageable by rearward thrust on said feed screw and feed nut, a stationary support for said power means, and spring means interengaged between said stationary power means support and said feed nut and operable to resist clutch engaging movement of said feed nut.

19. Feed mechanism for a drill or the like comprising power means, a stationary support for said power means, a feed screw adapted to support a drill on one end thereof, driving means for feeding said screw forward, driven by said power means and including slipping clutch means and a screw rotating member slidably keyed to the feed screw, a feed nut threaded upon said feed screw and positively rotated at all times in synchronism with said power means, control means interposed between said feed nut and said clutch means, and operable automatically upon said clutch means to decrease its slipping action in response to a rearward thrust on said feed screw acting through said feed nut, to retard longitudinal movement of said screw, and manual regulating means non-rotatable by said power means, directly interengaged between said control means and said stationary power means support, and operable at will while said feed screw is driven by said power means to regulate said automatically operable control means thus to vary the amount of decrease in slippage of said clutch means effected by a given rearward thrust on said feed screw, and consequently the amount of retardation of such longitudinal screw movement.

20. Feed mechanism for a drill or the like comprising power means, drill supporting means, drive means, including clutch means, driven by said power means and connected to rotate said drill supporting means, control means rotatable by said power means operable automatically upon said clutch means in response to an increase in resistance to movement of the drill reacting through said drill supporting means to increase the rotative speed thereof relative to that of said power means, manual regulating means operable at will while said drill supporting means are rotated by said power means to regulate said automatically operable control means, thus to vary the amount of such increase in rotative speed of said drill supporting means relative to said power means for a given increase in resistance to drill movement, and means interengaged between and rotatively separating said control means and said regulating means to prevent transmission of appreciable torque from said control means driven by said power means to said regulating means.

21. Feed mechanism for a drill or the like, comprising power means, drill supporting means, drill feed means including a feed screw element and a cooperating feed nut element, each rotated by said power means independently of the other and operatively connected to move said drill supporting means longitudinally, control means operable automatically by an increase in rearward thrust upon the drill to vary the speed at which one of said feed elements is rotated by said power means, to retard the longitudinal movement of said drill supporting means, manual regulating means incapable of being rotated by said power means and operable at will while said feed elements are rotated by said power means to vary the amount of retardation of said longitudinal movement of the drill supporting means for a given increase in rearward drill thrust, and means interengaged between and rotatively separating said rotative drill feed means and said regulating means to prevent transmission of appreciable torque from said drill feed means to said regulating means.

HENRY S. HOFFAR.